United States Patent
Wood

(10) Patent No.: US 7,318,620 B2
(45) Date of Patent: Jan. 15, 2008

(54) FLEXIBLE CROSS FLOW VORTEX TRAP DEVICE FOR REDUCING THE AERODYNAMIC DRAG OF GROUND VEHICLES

(75) Inventor: Richard M. Wood, Virginia Beach, VA (US)

(73) Assignee: Solus Solutions and Technologies, LLC, Hampton, VA (US)

( * ) Notice: Subject to any disclaimer, the term of this patent is extended or adjusted under 35 U.S.C. 154(b) by 166 days.

(21) Appl. No.: 11/341,944

(22) Filed: Jan. 3, 2006

(65) Prior Publication Data

US 2007/0132276 A1 Jun. 14, 2007

Related U.S. Application Data

(62) Division of application No. 10/914,672, filed on Aug. 10, 2004, now Pat. No. 6,986,544.

(51) Int. Cl.
*B60J 1/00* (2006.01)
(52) U.S. Cl. .................. 296/180.1; 296/180.4
(58) Field of Classification Search ............ 296/180.1, 296/180.4, 91, 180.2, 181.5, 180.3; 105/1.1, 105/1.2
See application file for complete search history.

(56) References Cited

U.S. PATENT DOCUMENTS

| | | | |
|---|---|---|---|
| 3,348,873 A | 10/1967 | Saunders | |
| 3,697,120 A | 10/1972 | Saunders | |
| 3,834,572 A | 9/1974 | Eskenazi | |
| 3,854,769 A * | 12/1974 | Saunders | 296/180.4 |
| 3,866,967 A | 2/1975 | Landry et al. | |
| 3,934,922 A | 1/1976 | MacCready, Jr. et al. | |
| 3,945,677 A | 3/1976 | Servais et al. | |
| 3,971,586 A * | 7/1976 | Saunders | 296/180.4 |
| 4,021,069 A * | 5/1977 | Hersh | 296/180.4 |
| 4,030,779 A | 6/1977 | Johnson | |
| 4,035,013 A | 7/1977 | Abbott, III | |
| 4,068,883 A | 1/1978 | Meinecke et al. | |
| 4,142,755 A | 3/1979 | Keedy | |
| 4,257,640 A | 3/1981 | Wiley | |
| 4,269,444 A | 5/1981 | Emory | |
| 4,310,192 A * | 1/1982 | Fitzgerald | 296/180.4 |
| 4,318,566 A * | 3/1982 | Fitzjarrell | 296/180.4 |

(Continued)

*Primary Examiner*—Kiran B. Patel
(74) *Attorney, Agent, or Firm*—Williams Mullen; M. Bruce Harper

(57) ABSTRACT

An improved device for the reduction of aerodynamic drag and for improved performance of multiple component vehicles by reducing the pressure on the front face of the trailing vehicle or vehicle component by controlling the flow in the gap between the leading vehicle component and the trailing vehicle component. An improved device for generating a reduction in the drag force on a bluff face object moving through air. The device consist of the application of a plurality of forward extending surfaces that are positioned adjacent to one another on the forward facing surface of a bluff face object and are aligned parallel to the object center line and perpendicular to the local flow direction. The reduction in drag force results from the summation of a plurality of local reductions in drag force generated by the interaction of vortex structures emanating from the leading edges of the plurality of forward extending surfaces with the forward facing surface of a blunt face object. The objects and advantages also extend to other applications in which an object or vehicle is moving through either a gas or fluid.

21 Claims, 10 Drawing Sheets

U.S. PATENT DOCUMENTS

| | | | |
|---|---|---|---|
| 4,343,506 A | 8/1982 | Saltzman | |
| 4,360,232 A * | 11/1982 | Elder | 296/180.4 |
| 4,468,060 A * | 8/1984 | FitzGerald et al. | 296/180.4 |
| 4,702,509 A | 10/1987 | Elliott, Sr. | |
| 4,867,397 A | 9/1989 | Pamadi et al. | |
| 4,978,162 A | 12/1990 | Labbee | |
| 5,280,990 A | 1/1994 | Rinard | |
| 5,487,586 A | 1/1996 | Kinkaide | |
| 5,536,062 A | 7/1996 | Spears | |
| 5,791,724 A * | 8/1998 | Wasley | 296/180.1 |
| D415,085 S * | 10/1999 | Fitzgerald et al. | D12/181 |
| 6,131,853 A | 10/2000 | Bauer et al. | |
| 6,286,892 B1 * | 9/2001 | Bauer et al. | 296/180.4 |
| 6,634,700 B1 | 10/2003 | Calvert | |
| 6,979,049 B2 * | 12/2005 | Ortega et al. | 296/180.4 |
| 2004/0239146 A1 * | 12/2004 | Ortega et al. | 296/180.2 |
| 2005/0040669 A1 * | 2/2005 | Wood | 296/180.1 |

* cited by examiner

FLEXIBLE CROSS FLOW VORTEX TRAP DEVICE FOR REDUCING THE AERODYNAMIC DRAG OF GROUND VEHICLES

CROSS-REFERENCE TO RELATED APPLICATIONS

This application is a Divisional Application to application Ser. No. 10/914,672, filed Aug. 10, 2004, now U.S. Pat. No. 6,986,544.

ORIGIN OF THE INVENTION

The invention described herein was made by employees of the United States Government, and may be manufactured and used by or for the Government without payment of any royalties thereon or therefor.

REFERENCE TO SEQUENCE LISTING, A TABLE, OR A COMPUTER PROGRAM LISTING COMPACT DISK APPENDIX

Not applicable.

BACKGROUND

1. Field of Invention

The invention relates to the reduction of aerodynamic drag for moving ground vehicles; specifically to an improved device for the reduction of aerodynamic drag, the improvement in operational performance and an increase in fuel economy of multiple component vehicles by lowering the pressure acting on the front face of the trailing vehicle or vehicle component by controlling the air flow in the gap between the leading vehicle component and the trailing vehicle component.

2. Description of Prior Art

It is known by those skilled in the art that the aerodynamic drag for a multiple component vehicle such as a tractor-trailer truck increases with increasing separation distance between the tractor and the trailer. The separation distance between the aft facing rear surface of a tractor and/or tractor mounted aerodynamic fairings and the forward facing front surface of the trailer is referred to as the gap distance. It is also known by those skilled in the art that the amount of air that enters the gap and thus the aerodynamic drag increases with increasing crosswind flow. In the prior art there have been attempts to reduce the aerodynamic drag resulting from flow in the gap region. Prior art show the use of both aerodynamic fairings mounted on the tractor cab roof and extensions attached to the side of the tractor cab to close the gap distance between the tractor and the trailer. A reduction in the gap distance will reduce or eliminate gap flow and thereby reduce aerodynamic drag, see U.S. Pat. Nos. 5,536, 062, 4,142,755, 3,945,677, and 3,834,572. These gap closure devices, while successful in reducing or eliminating gap flow, are typically complex devices that are comprised of moving parts that require maintenance and add weight to the vehicle. The increased weight and complexity of the devices has a negative impact on operational performance of the vehicle and interfere with other vehicle systems.

Other concepts as documented in U.S. Pat. Nos. 5,280, 990, 3,971,586, 3,697,120, 3,934,922 and 3,866,967 re-contour or modify the forward facing front surface of the trailer to reduce the aerodynamic drag of the trailer. The drag reduction results from the gap flow impinging on a trailer front surface with a curved surface instead of the typical flat surface. These trailer front surface mounted devices reduce the aerodynamic drag for the no crosswind condition, but the devices do not provide significant drag reduction when crosswind flow is present. The subject devices consist of complex shapes provide aerodynamic drag reduction over a limited range of vehicle operational conditions and these devices do not provide significant aerodynamic drag reduction at crosswind flow conditions. The majority of these types of devices are comprised of moving parts that add complexity and require maintenance. All of these devices would add significant weight to the vehicle. These above listed attributes of these devices have a negative impact on vehicle operational performance and interfere with normal operations of the vehicle.

U.S. Pat. Nos. 4,257,640, 4,068,883 and 4,035,013 apply a vertical surface located on the vehicle centerline that connects the tractor base to the trailer front surface to reduce the aerodynamic drag resulting from gap flow. These devices are complex and comprised of moving parts that require maintenance. These devices interfere with normal operations of the truck and add weight to the vehicle that would has a negative impact on operational performance of the vehicle.

Several concepts have attempted to minimize the negative effect of crosswind conditions on aerodynamic drag and stability of tractor-trailer truck systems. U.S. Pat. No. 5,526, 062 adds a plurality of fairings and vents to the tractor in an effort to control the flow impinging on the tractor and then passing into the gap region between the tractor and trailer. U.S. Pat. No. 3,348,873 adds a plurality of fairings to the tractor in an effort to control the flow impinging on the tractor and passing into the gap region between the tractor and trailer. These two patents provide drag reduction but are complex devices that are comprised of moving parts. These devices also interfere with normal operations of the truck and add weight to the vehicle. These characteristics of the devices result in a negative impact on the vehicle operational performance.

U.S. Pat. No. 4,867,397 adds a pair of thin rigid vertical plates to the forward surface of a vehicle body to control the separation and reattachment of the flow at the corners of a flat-faced body and thereby reduce drag. This patent would only be useful for vehicles that have not been designed in accordance with existing best practices that radius the corners of such bodies and vehicles to accomplish the drag reduction goal. The patent does not take advantage of crosswind conditions. The patent does not provide drag reduction for a forward facing surface located in the gap of a multiple component vehicle.

SUMMARY OF THE INVENTION

The invention relates to an aerodynamic drag reduction device for use on a vehicle. The device includes a plurality of surfaces attached to a forward facing exterior surface of the vehicle. The surfaces are substantially equally spaced apart from each other and positioned substantially symmetrically the vertical plane of symmetry of the vehicle and the surfaces are aligned so as to be substantially parallel to the longitudinal axis of the vehicle. The surfaces typically have a thickness of less than 1 inch and extend out from the exterior surface of the vehicle a distance of 10 to 50 percent of the longitudinal gap distance between the forward facing surface of the trailing vehicle and the rear facing surface of the leading vehicle. The surfaces are typically equal in size and length and are aligned with each other with respect to the distance from the top edge of the vehicle. This configuration permits the surfaces generate vortices of substantially equivalent strength and rotational velocity to reduce air pressure on the forward facing exterior surface of the vehicle and reduce drag.

The surfaces may be rigid or flexible and may be used on many types of vehicles, such as tractor-trailer trucks, trains or rail vehicles, or automobiles pulling trailers. The device is also useful when attached to a trailing vehicle or a multi-component vehicle, such as for an automobile pulling a trailer or in a truck having multiple sections. The surfaces may be integrally formed with the vehicle or may be attached individually or in sections, such as when more than one surface is attached to a base plate.

An object of the invention is to use the cross flow in the gap to provide drag reduction, increased fuel economy and improved operational performance by creating a preferred pressure loading on the front face of the trailing vehicle or vehicle component of a multiple component vehicle system such as a tractor-trailer truck. A multiple component vehicle can be comprised of; 1) a single powered component that is either pushing or pulling one or more un-powered components or 2) duplicate or similar components with one of the components pulling or pushing the other components and 3) a number of sub-components that are attached to a parent vehicle and are aligned in tandem one behind the other. Examples of multiple component ground vehicles would be a tractor-trailer truck, tractor tandem-trailer truck, train, and an automobile pulling a trailer. The invention relates to flow that exists in the gap between the base of a leading vehicle or vehicle component and the front face of a trailing vehicle or vehicle component. The flow in the gap between a leading vehicle component and the trailing vehicle component is a function of the geometry of the vehicle components, the crosswind conditions and the gap width. The velocity and flow direction of the gap flow is a direct function of the free stream crosswind velocity and crosswind flow direction. The invention will use the local cross-flow in the gap to reduce aerodynamic drag and will take advantage of crosswind conditions to provide further reductions in the aerodynamic drag of a multiple component vehicle. The invention uses aerodynamic principles to force the gap flow to separate at the leading edges of the device and form a vortex that is trapped between adjacent surfaces of the invention. The trapped vortex interacts with the forward facing front face of the trailing vehicle or vehicle component, of a multiple component vehicle, and reduces the pressure acting on this surface thereby producing a reduction in aerodynamic drag.

The device provides improved performance for both the no crosswind condition, in which the air is still, and for crosswind flow that may be directed from any position around the vehicle. For all moving vehicles that operate on the ground or in water, a crosswind flow is always present due to a combination of atmospheric and environmental factors and the interaction of the naturally occurring wind with stationary geological and manmade structures adjacent to the vehicle path as well as interfering flows from adjacent moving vehicles. The device is designed to take advantage of the ever-present cross flow in the gap of a multiple component vehicle. The device is designed to provide increasing amount of aerodynamic drag reduction with increasing crosswind and gap cross flow. The device is designed to reduce aerodynamic drag for the all crosswind conditions for multiple component vehicles. The subject device uses vortex flows to provide a distributed drag reduction loading on the forward facing front surface of the trailing vehicle or vehicle component. The subject device does not require a modification to the tractor and provides reduced aerodynamic drag for a wide range of tractor concepts. The subject invention is a simple device comprised of a minimum number of thin rigid surfaces that attach to the forward facing surface of a trailing vehicle or vehicle component, of a multiple component vehicle. The spacing and orientation of the surfaces are dependent upon the base geometry of the leading vehicle, front face geometry of the trailing vehicle and the gap distance between the leading and trailing vehicles, of a multiple component vehicle.

The present invention pioneers a novel device that is comprised of a plurality of adjacent surfaces that are attached to the forward facing surface (front face) of a trailing vehicle or trailing vehicle component, of a multiple component vehicle. The plurality of adjacent surfaces is distributed over a majority of the front face of the trailing vehicle or vehicle component. To minimize forward facing surface area and thus aerodynamic drag of the device the plurality of adjacent surfaces are aligned in planes or surfaces that are parallel to the longitudinal axis of the multiple component vehicle. The longitudinal axis of the vehicle also defines the direction of motion of the vehicle. Each of the adjacent surfaces extends forward from the front face of the trailing component of a multiple component vehicle. The plurality of adjacent surfaces comprising the invention is orientated in a plane or surface that is perpendicular to the dominant gap cross flow direction. The orientation and/or shape of the plurality of adjacent surfaces are a function of the leading vehicle or vehicle component base geometry and the trailing vehicle or vehicle component front face geometry. For ground vehicles, such as tractor-trailer trucks, the vehicle cross-section shape is predominantly rectangular. For a rectangular cross-section shape vehicle the plurality of forward extended adjacent surfaces, comprising the device, will be planar and orientated vertically. Each surface comprising the device extends vertically along the height of the front face of the trailing vehicle and the surface located furthest outboard is positioned inboard of the corner radius on the vehicle front face. This arrangement, of the plurality of surfaces comprising the invention, ensures that all surfaces are aligned perpendicular to the direction of the gap cross flow for this class of ground vehicle. The direction of the gap cross flow is parallel to the ground and from the outboard edge of the vehicle towards the vehicle centerline and/or plane-of-symmetry. The number, shape, width and orientation of the plurality of forward extended adjacent surfaces that comprise the invention are determined by; the gap distance, the base geometry of the leading vehicle or vehicle component and the front face geometry of the trailing vehicle or vehicle component.

The flow in the gap has a flow direction that is orientated from the outboard edge of the gap inward towards the vehicle longitudinal centerline. The magnitude of the gap cross-flow angle, cross-flow velocity and volume of the cross flow is a function of the leading vehicle or vehicle component base geometry, trailing vehicle or vehicle component front face geometry, gap distance between the base of the leading vehicle or vehicle component and the front face of the trailing vehicle or vehicle component, free stream crosswind flow direction, and forward speed of the vehicle. The crosswind flow direction at the outer edge of the gap is a function of interfering flows from adjacent vehicles, free stream atmospheric conditions, adjacent ground structures and vegetation and other obstructions to the naturally occurring free stream flow conditions. The flow in the gap significantly affects the aerodynamic drag, operational performance and handling qualities of a multiple vehicle or multiple component vehicle.

The reduction of aerodynamic drag, improved operational performance and improved stability of multiple component vehicles is obtained by reducing the pressure loading on the front face of the trailing vehicle or vehicle component. The pressure loading on the front face is reduced by eliminating the impingement of the gap flow onto the front face of the trailing vehicle or vehicle component. The pressure loading on the front face is further reduced by forcing the gap cross flow to separate at the leading edge of each of the plurality of adjacent surfaces comprising the invention. The plurality of adjacent surfaces comprising the invention, extend forward from the exterior surface of the trailing vehicle front face. More specifically, this invention relates to a device and method for reducing aerodynamic drag utilizing a plurality of forward extended adjacent surfaces that are specifically shaped, sized, and orientated to eliminate impingement of the gap flow onto the front face of the trailing vehicle and to create a series of vortices that interact with the forward facing front surface of the trailing vehicle thereby lowering the pressure on the front face and reducing aerodynamic drag of the vehicle. The number of surfaces, the spacing between adjacent surfaces, the shape of the surfaces and the width of the surfaces are the primary design variables that are used to eliminate the gap flow from impinging onto the front face of the trailing component or vehicle. Having each surface of the subject invention aligned parallel to the vehicle axis eliminates forward facing surface area and thereby minimizes the aerodynamic drag of the subject invention. To ensure that a vortex is formed by the interaction of the gap flow with the leading edge of each surface of the subject invention, the thickness of each surface is minimized and the leading edge of the surface is made aerodynamically sharp.

The invention may be used to reduce the drag of all existing and future multiple component ground vehicles (i.e., cars with trailers, tractor-trailer trucks, trains, etc.).

Objects and Advantages

Several objects and advantages of the present invention are:

(a) to provide a novel process to reduce the drag of multiple component vehicles;
(b) to provide a means to use the forward facing surface of a body or vehicle to reduce drag;
(c) to provide a means to reduce the aerodynamic drag and improve the operational efficiency of vehicles;
(d) to provide a means to reduce the aerodynamic drag and improve the fuel efficiency of vehicles;
(e) to provide a means to conserve energy and improve the operational efficiency of vehicles;
(f) to provide a means to reduce the aerodynamic drag without a significant geometric modification to existing vehicles;
(g) to provide an aerodynamic drag reduction device that uses a plurality of forward extended adjacent surfaces;
(h) to allow the surface contour of each of the plurality of adjacent surfaces to be variable to meet the specific needs of the application;
(i) to allow the spacing, location, and orientation of each of the plurality of adjacent surfaces to be variable to meet the specific needs of the application;
(j) to create a number of low pressure and low aerodynamic drag forces on the front face of a trailing vehicle component that are used to reduce the aerodynamic drag of the subject trailing vehicle component and the multiple component vehicle;
(k) to allow the device to be fabricated as a number of independent surfaces that may be applied to an existing vehicle;
(l) to allow the device to be fabricated as a single independent unit that may be applied to an existing vehicle;
(m) to allow the device to be fabricated as an integral part of a vehicle;
(n) to allow for optimal positioning of each of the plurality of adjacent surfaces in the vehicle gap flow field;
(o) to have minimum weight and require minimum volume within the vehicle;
(p) to have minimum maintenance requirements;

Further objects and advantages are to provide a device that can be easily and conveniently used to minimize aerodynamic drag on any ground vehicle for the purposes of improving the operational performance of the vehicle. Still further objects and advantages will become apparent from a consideration of the ensuing description and drawings.

DETAILED DESCRIPTION OF THE INVENTION

The following descriptions are of exemplary embodiments of the invention only, and are not intended to limit the scope, applicability or configuration of the invention in any way. Rather the following description is intended to provide a convenient illustration for implementing various embodiments of the invention. As will become apparent, various changes may be made in the function and arrangement of the elements described herein without departing from the spirit and scope of the invention. For example, though not specifically described, many surface contours, widths, leading edge shapes, spacing and orientation of the plurality of forward extended surfaces should be understood to fall within the scope of the present invention. For example, though not specifically described many candidate vehicles, numerous fabrication means and materials, a variety of attachment means and a variety of materials should be understood to fall within the scope of the present invention.

Referring now in detail to the drawings, like numerals herein designate like numbered parts in the figures.

Figure 1:
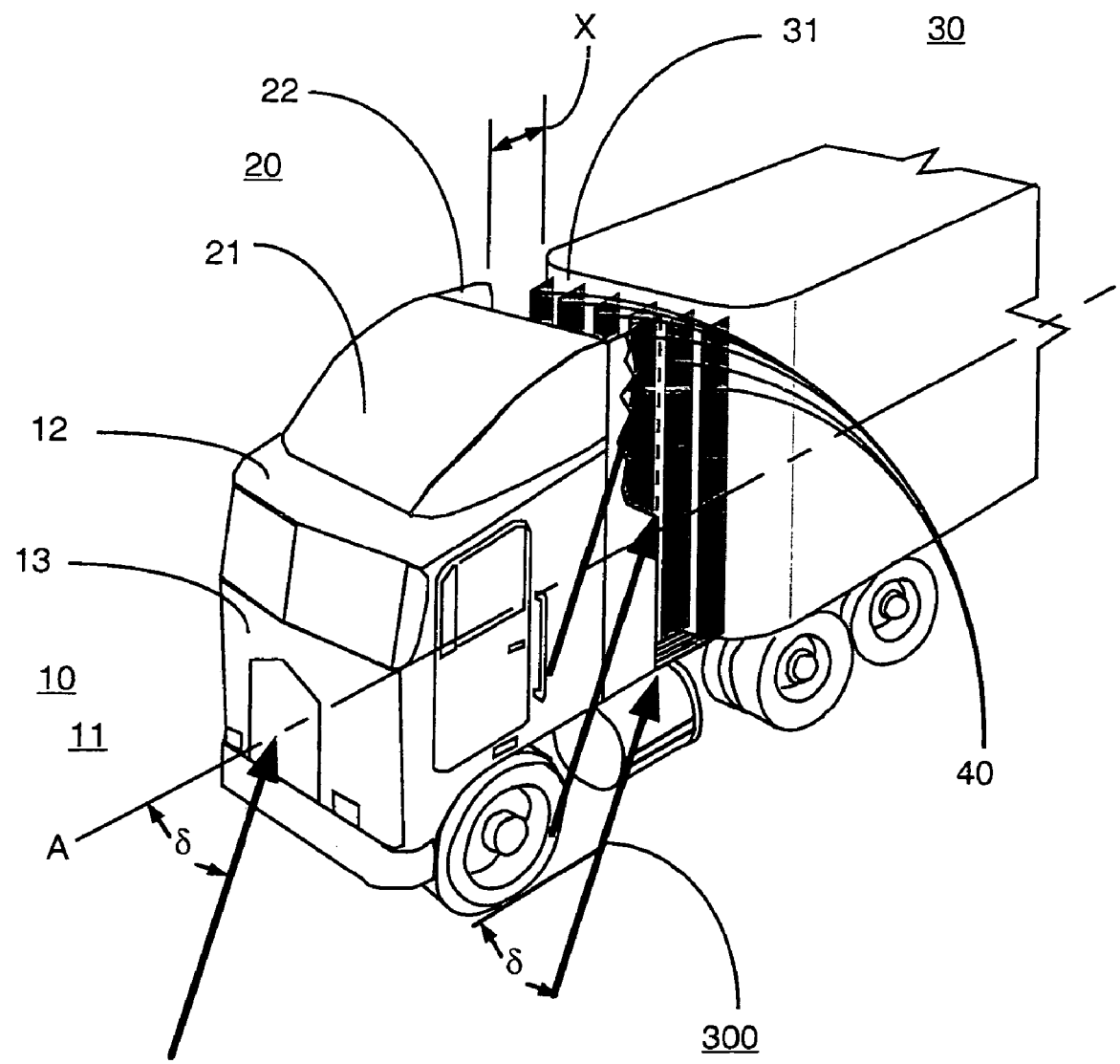
FIG. 1 is a front perspective view of a tractor and the forward portion of a trailer of a tractor-trailer truck system with the subject invention installed on the forward facing exterior surface of the trailer.

FIG. 1 is a front perspective view of the tractor and the front portion of the trailer of a typical tractor-trailer truck system 1 with the subject invention 40 installed on the forward facing front surface 31 of a trailer 30. The tractor-trailer truck system 1 is comprised of a tractor 10 and a trailer 30. The tractor is comprised of a cab 11 and an aerodynamic fairing system 20. The aerodynamic fairing system is comprised of a cab roof fairing 21 and side extension fairings 22 that are designed for a typical tractor-trailer truck system to minimize the longitudinal gap distance X between the tractor cab 11 and/or the aerodynamic fairing system 20 and trailer front face 31 and to direct the flow so that it will bridge the gap between the tractor cab 11 and/or the aerodynamic fairing system 20 and the trailer front surface 31 and not interfere with the operations of the vehicle. The subject invention 40 is shown installed on the forward facing front surface 31 of a trailer 30. The number, shape, size, and orientation of the plurality of forward extended adjacent surfaces comprising the subject invention 40 are a function of the tractor geometry, trailer geometry and gap distance X. The subject invention 40, provides aerodynamic drag reduction for all crosswind flow 300 conditions including the no crosswind flow conditions in which the crosswind flow angle, δ, is 0.0. The crosswind flow angle is measured from the vehicle longitudinal axis A that also defines the vehicle direction of motion. The subject invention 40 takes advantage of crosswind flow 300 conditions to provide increased aerodynamic drag reduction, compared to the no crosswind flow 300 condition. Aerodynamic drag reduction occurs when flow enters the gap region and is directed towards the vehicle centerline A. The gap flow encounters the leading edge of each of the plurality of forward extended surfaces comprising the subject invention 40 and separates at the leading edge of each surface comprising the device 40 and forms a vortex that resides between adjacent surfaces of the device 40 and on the forward facing front surface 31 of the trailer 30. The vortex generates a stable low pressure that acts on each surface surfaces of the device and on the forward facing surface 31 of the trailer 30. The strength of the vortices formed by the device 40 and thus the magnitude of the aerodynamic drag reduction will increase with increasing free stream crosswind flow angle δ. The low pressures acting on the surfaces comprising the device 40 do not affect the aerodynamic drag because each of the plurality of forward extended surfaces comprising the device 40 are aligned parallel to the vehicle axis A.

Figure 2A:
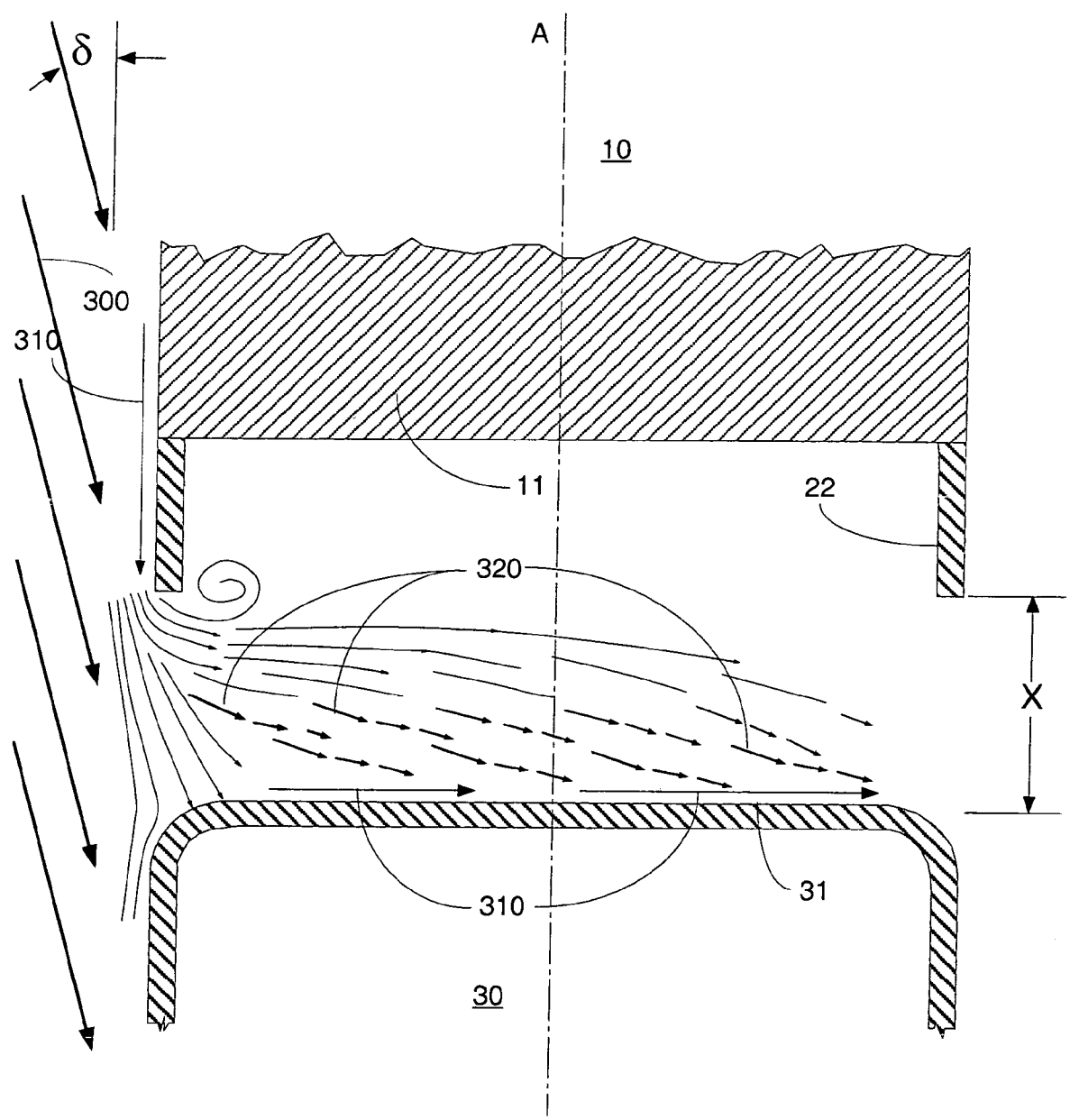
FIG. 2a is a cross section view, in a plane horizontal to the ground, of the gap geometry and gap flow conditions for a tractor-trailer truck system without the subject invention installed.
Figure 2B:
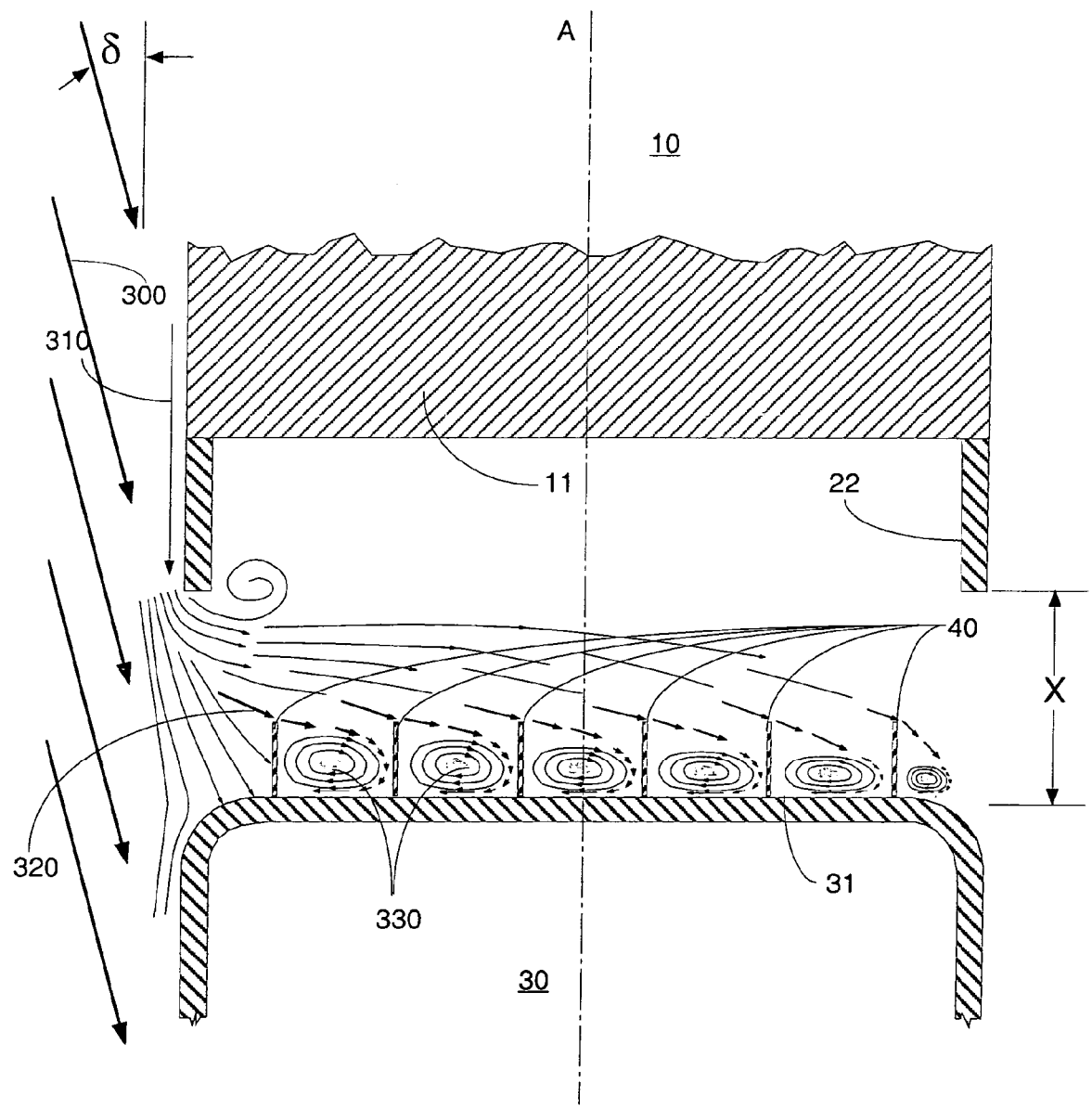
FIG. 2b is a cross section view, in a plane horizontal to the ground, of the gap geometry and gap flow conditions for a tractor-trailer truck system with the subject invention installed.

FIG. 2a and FIG. 2b show flow patterns in the gap region of a multiple component tractor-trailer truck 1 with and without the present invention 40 installed. In FIG. 2a and FIG. 2b the flow passing about the vehicle and in the gap region is represented by arrow tipped lines 300, 310 and 320. The circular cluster of arrow tipped lines represent vortices 330 generated by the subject invention 40. FIG. 2a and FIG. 2b show a cross section view, in a plane horizontal to the ground, of the tractor 10 aft facing surface geometry, trailer front surface 31 geometry, side fairing 22 geometry, and gap flow conditions, for a typical tractor-trailer truck system 1. The gap is defined as the distance X between the trailing edge of the tractor 10, tractor cab 11 or aerodynamic fairing 22 and the trailer front surface 31. FIG. 2a shows the gap cross flow characteristics for a typical tractor-trailer truck without the subject invention 40 installed and for the condition of a moderate crosswind flow 300 condition. For this condition, a surface flow 310 develops on the tractor that expands into the gap at the trailing edge of the tractor 10, tractor cab 11 or aerodynamic fairing 22. A gap cross flow 320 develops that impinges on the trailer forward facing surface 31 producing high pressures and high aerodynamic drag. Attached surface flow 310 occurs on the trailer front face 31 that is directed to the vehicle centerline A. The flow features shown in FIG. 2a are present for all crosswind flows 300 and crosswind flow angles δ. An increase in crosswind flow angle δ produces an increase in the velocity of the flow that impinges on the trailer front face 31 resulting in increased aerodynamic drag. FIG. 2b shows gap flow characteristics with the subject invention 40 installed on the trailer front face 31. FIG. 2b shows a cross section view, in a plane horizontal to the ground, of the tractor 10 aft facing surface geometry, trailer front surface 31 geometry, side fairing 22 geometry, subject invention 40 and gap flow conditions 320 and 330, for a tractor-trailer truck system 1. The gap is defined as the distance X between the trailing edge of the tractor 10, tractor cab 11 or aerodynamic fairing 22 and the trailer front surface 31. FIG. 2b shows the gap flow characteristics for the condition of a moderate crosswind flow 300 condition. A surface flow 310 develops on the tractor that expands into the gap at the trailing edge of the tractor 10, tractor cab 11 or aerodynamic fairing 22. A gap cross flow 320 develops which impinges on the leading edge of each of the forward extended surfaces comprising the subject invention 40. The flow separates at the leading edges of the device 40 and forms vortices 330 that reside between adjacent surfaces of the device 40 and on the trailer forward facing surface 31. The vortices generate a low pressure on the forward facing front surface 31 of the trailer 30 that reduces the aerodynamic drag of the trailer. The magnitude of the aerodynamic drag reduction is a direct function of the vortex 330 strength and the vortex strength is that is a function of the crosswind flow 300 and crosswind flow angle δ.

Figure 3A:
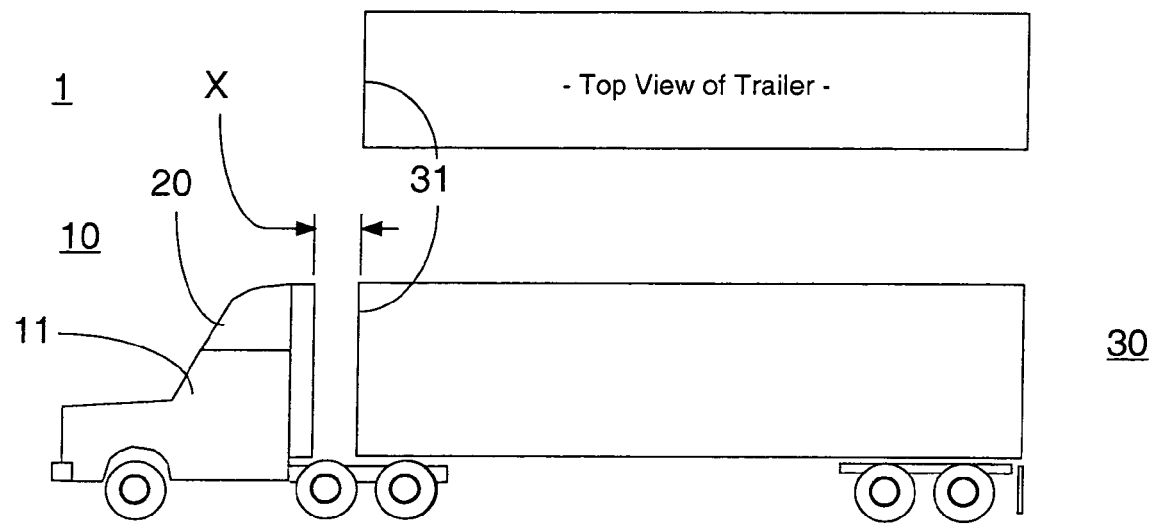
FIGS. 3a and 3b are side and top views of a tractor-trailer truck ground vehicle with and without the subject invention installed.
Figure 3B:
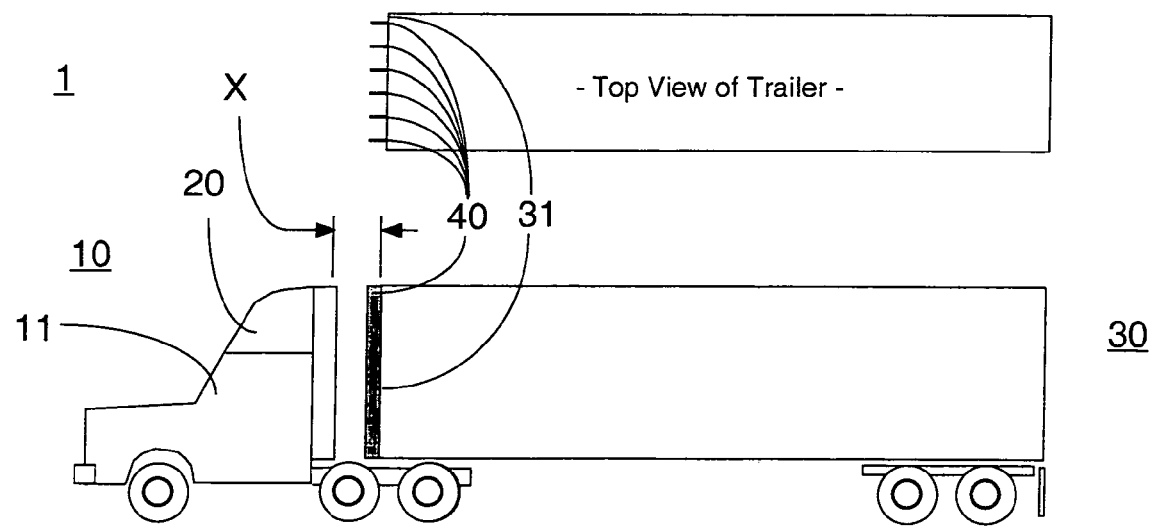
Figure 3C:
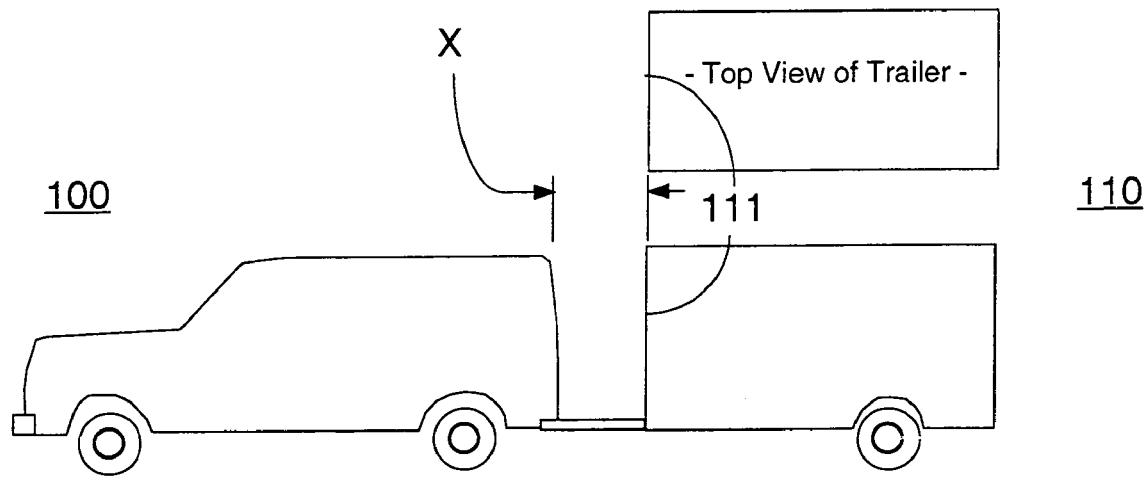
FIGS. 3c and 3d are side and top views of a automobile with trailer ground vehicle with and without the subject invention installed.
Figure 3D:
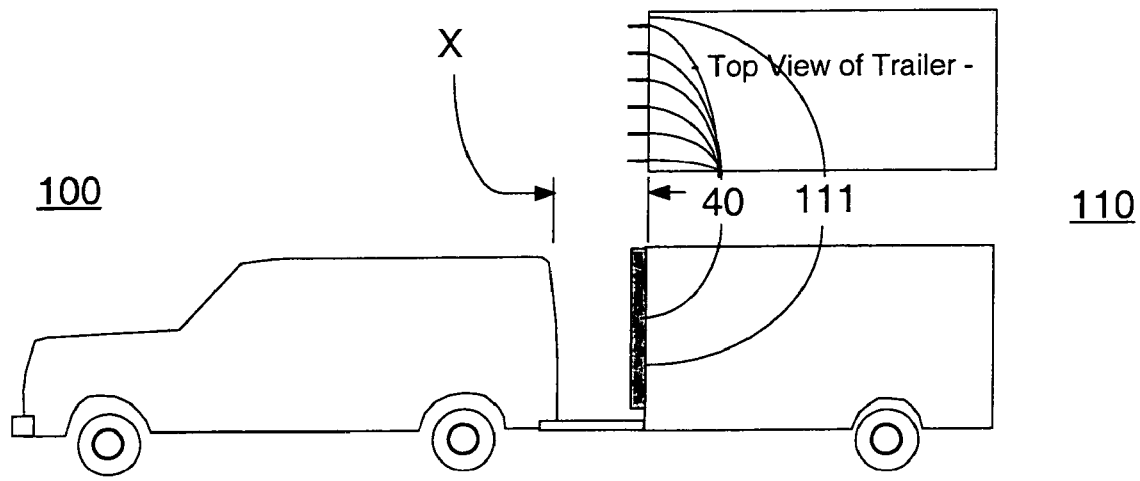

FIG. 3a through FIG. 3d are side and top views of example multiple component ground vehicles with and without the subject invention installed. FIG. 3a shows a typical tractor-trailer truck system 1, comprised of a powered tractor 10 that pulls a trailer 30. The tractor 10 is comprised of a cab 11 and an aerodynamic fairing system 20 that may be an integral part of the tractor 10. The tractor 10 is separated from the trailer 30 by a gap X to allow for ease of operation. The tractor aerodynamic fairing system 20 is designed to minimize the flow into the gap by two means; 1) minimizing the gap distance X and 2) by directing the flow over the gap. FIG. 3b shows the same tractor-trailer truck system 1 as that of FIG. 3a with the subject invention 40 installed on the forward facing front surface 31 of the trailer 30. FIG. 3c and FIG. 3d show a multiple component vehicle comprised of an automobile 100 pulling a trailer 110 with and without the subject invention 40 installed on the trailer forward facing front surface 111. The various multiple component vehicles depicted in FIG. 3 shows a powered vehicle pulling and an un-powered vehicle. Other embodiments of the invention would include multiple component vehicles in which the powered component is pushing an un-powered component. Additionally, other multiple component vehicles may be considered than those depicted.

Figure 4A:
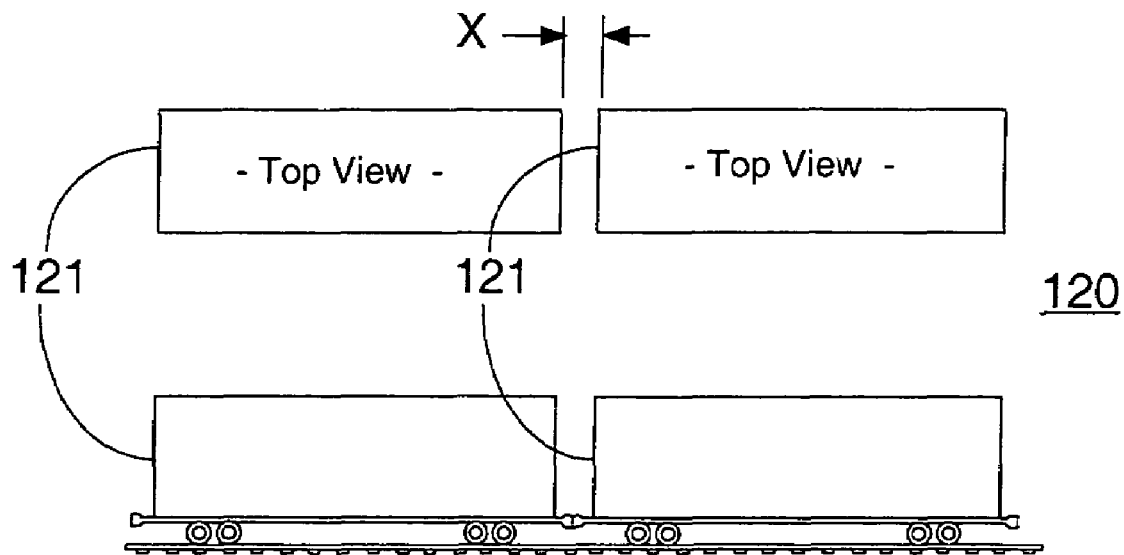
FIGS. 4a to 4c are side and top views of a multi-car train system depicting planar and alternate non-planar surfaces comprising the subject invention.
Figure 4B:
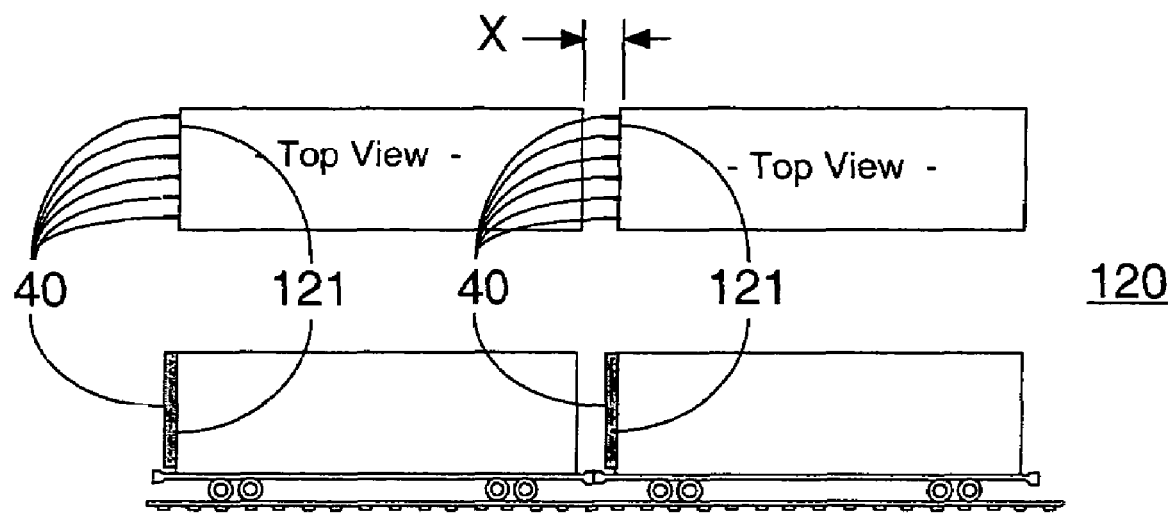
Figure 4C:
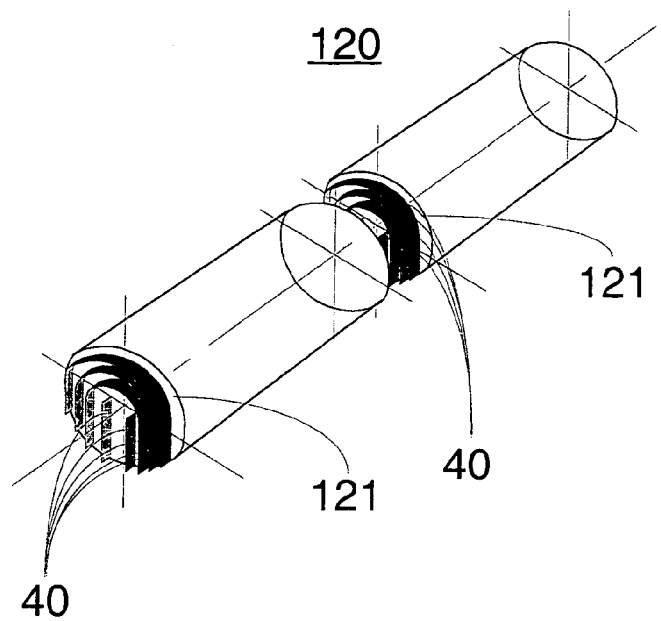
Figure 4C:
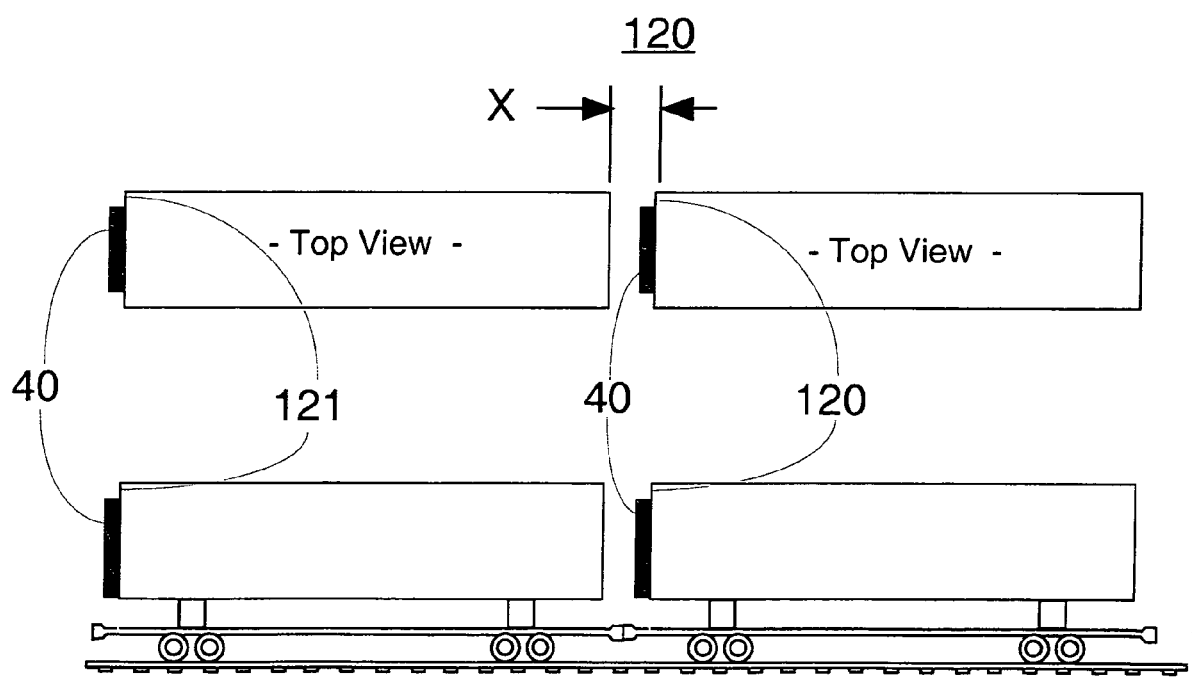

FIG. 4a through FIG. 4d are side and top views of two cars 120 of a multi-car train system depicting planar and alternate non-planar surfaces of the subject invention 40. FIG. 4a shows two train cars 120 of a typical multi-car train with square and/or rectangular forward facing front surfaces 121. The application of the subject invention 40 to the square and/or rectangular forward facing front surfaces 121 of the train car 120 would result in the subject invention 40 consisting of a plurality of forward extended adjacent planar surfaces where all surfaces are aligned parallel to each other. Each surface comprising the invention 40 is also aligned vertically across the front face 121 of the train car 120. FIG. 4c show two train cars 120 of a multi-car train with each car having a circular cross section front face 121 and a plurality of forward extended adjacent non-planar surfaces comprising the subject invention 40. Due to the circular cross section shape of both the leading and trailing train cars 120 the gap cross flow characteristics depicted in FIG. 2 does not represent the gap cross flow 320 characteristics for the geometry depicted in FIG. 4c. The axi-symmetric cross-section shape of the train cars 120 would produce radial cross flow characteristics in the gap. To align the plurality of forward extended adjacent surfaces perpendicular to this flow pattern, an alternate geometry for the forward extended surfaces of the subject invention 40 for the train cars 120 would be a combination of circular segments with planar segments as shown in FIG. 4c.

Figure 5A:
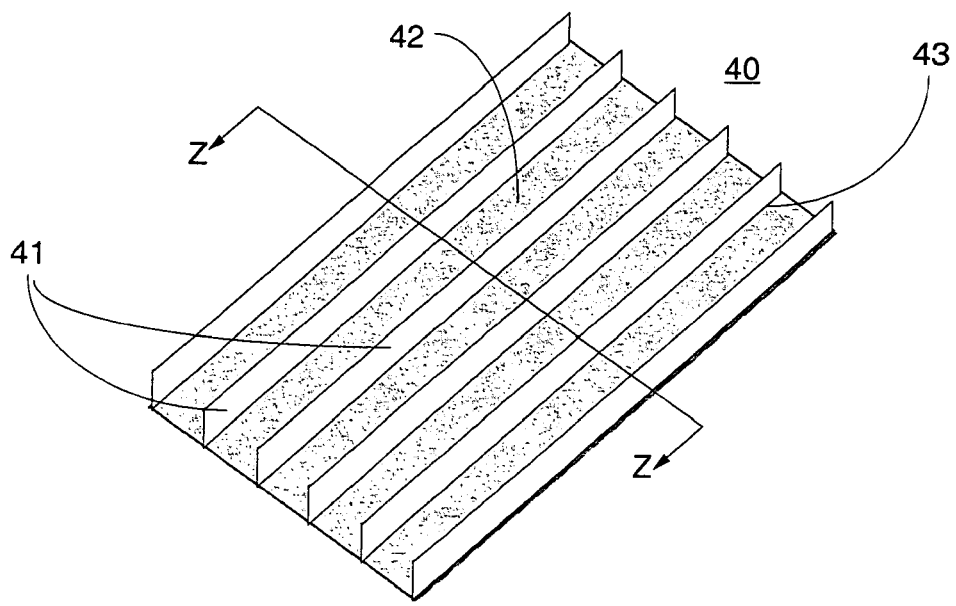
FIGS. 5a to 5c are perspective views and cross section views of the subject invention fabricated as a single independent unit.
Figure 5B:
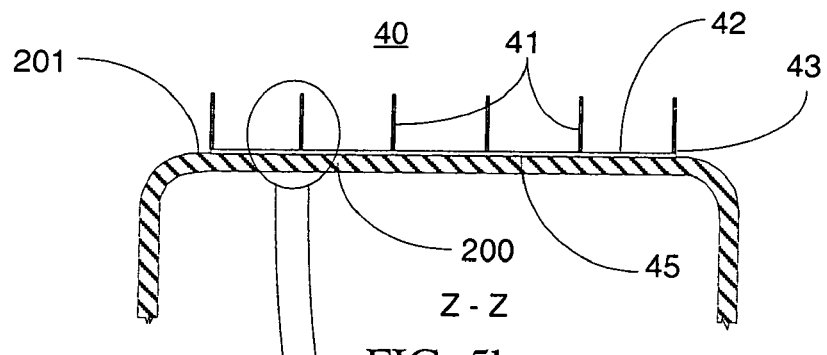
Figure 5C:
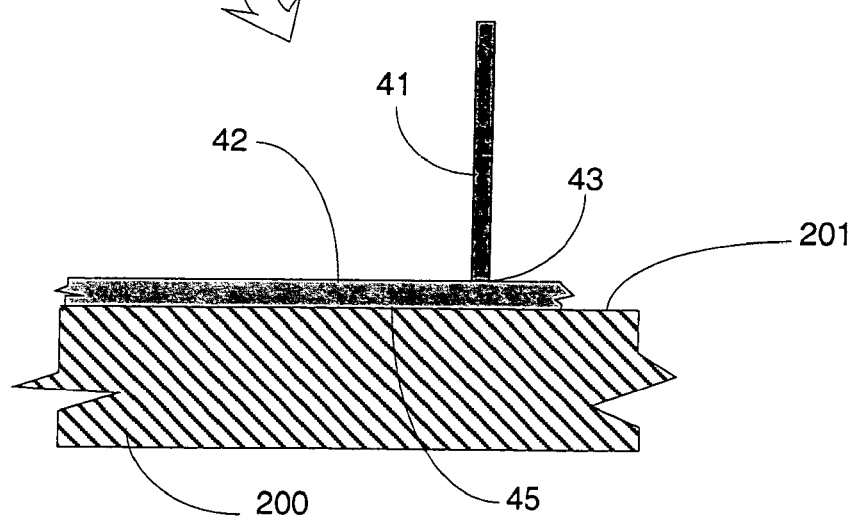
Figure 5D:
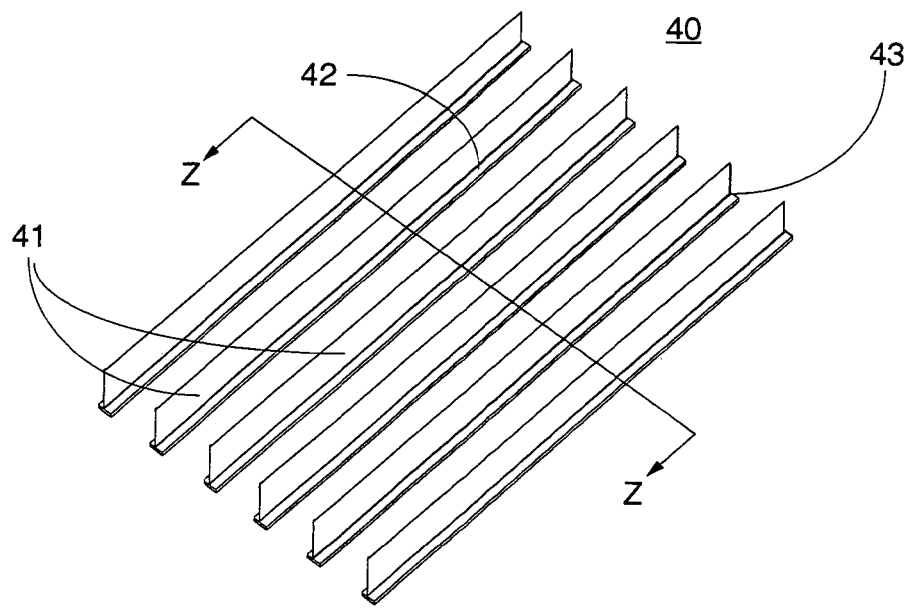
FIGS. 5d to 5f are perspective views and cross section views of the subject invention fabricated as a plurality of independent structures.
Figure 5E:
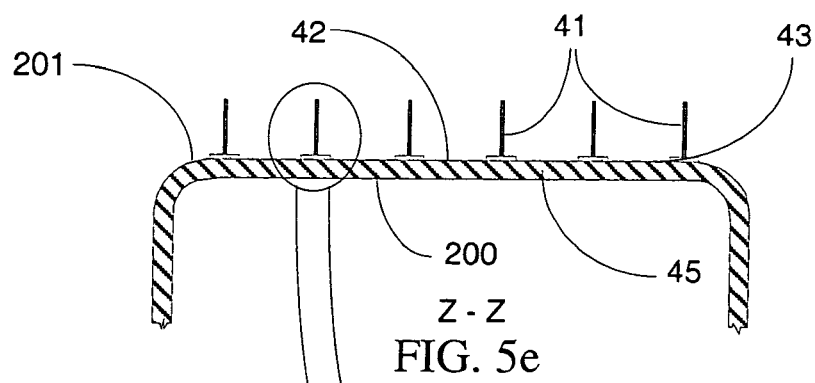
Figure 5F:
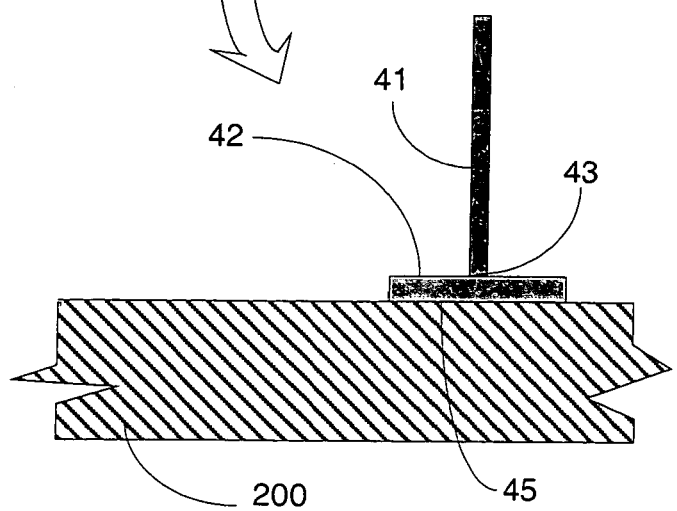
Figure 5G:
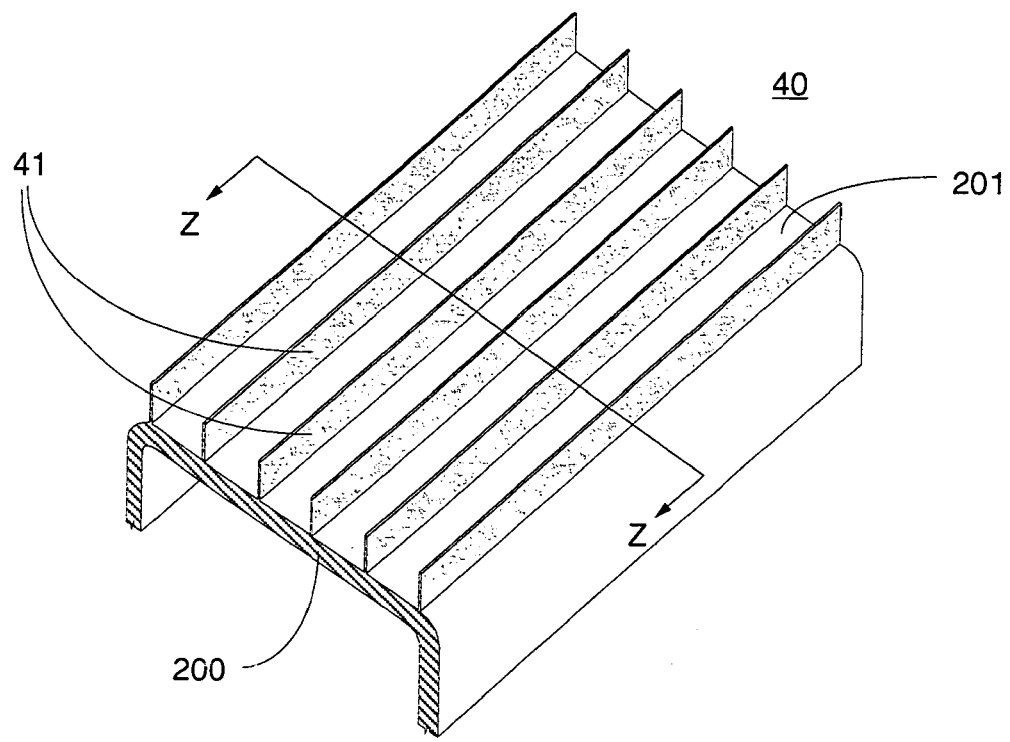
FIGS. 5g to 5i are perspective views and cross section views of the subject invention fabricated as an integral part of a vehicle.
Figure 5H:
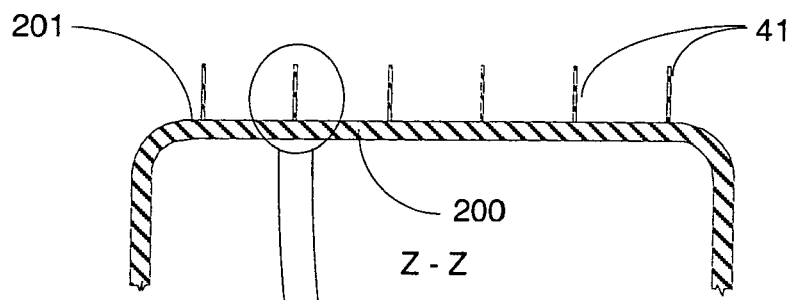
Figure 5I:
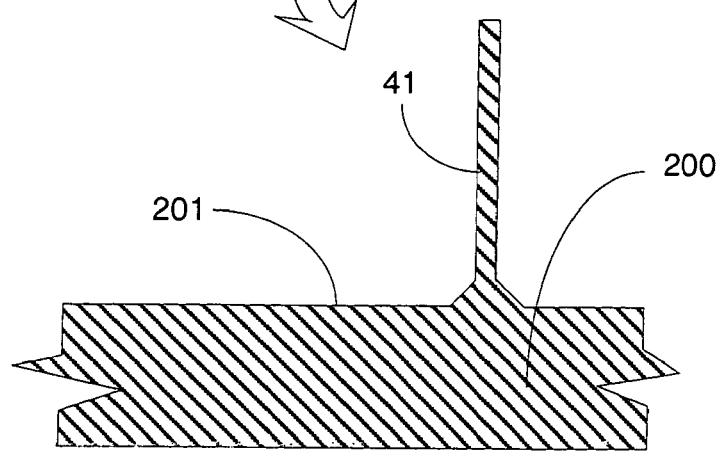

FIG. 5a to 5i are perspective views and cross section views of various fabrication methods and attachment methods for the subject invention 40. FIG. 5a through FIG. 5c are perspective views and cross section views of the subject invention 40 fabricated as a single independent unit that may be applied or attached to an existing vehicle or vehicle component. FIG. 5a through FIG. 5c show the subject invention 40 as a single independent unit consisting of a plurality of forward extended adjacent surfaces 41, a base plate 42 and means 43 to attach the forward extended adjacent surfaces 41 to the base plate 42. Example material for the forward extended adjacent surfaces 41 and the base plate 42 may be any light-weight and structurally sound wood, metal, plastic, composite or other suitable material. The material for the forward extended adjacent surfaces 41 and the base plate 42 may differ or may be of the same material and fabricated as a single component. The attachment means 43 may consist of bonding, welding or other appropriate structural attachments. The subject invention 40 is attached to the forward facing surface 201 of a vehicle 200 by a means 45 that may consist of bonding, mechanical fasteners or other appropriate means. FIG. 5d through FIG. 5f are perspective views and cross section views of the subject invention 40 fabricated as a plurality of independent structures that may be applied to an existing vehicle 200. FIG. 5d through FIG. 5f show the subject invention 40 as a plurality of independent structures each consisting of a forward extended surface 41, a base plate 42 and means 43 to attach the forward extended surface 41 to the base plate 42. Example material for the forward extended adjacent surfaces 41 and the base plate 42 may be any light-weight and structurally sound wood, metal, plastic, composite or other suitable material. The material for the forward extended adjacent surfaces 41 and the base plate 42 may differ or may be of the same material and fabricated as a single component. The attachment means 43 may consist of bonding, welding or other appropriate structural attachments. The subject invention 40 is attached to the forward facing surface 201 of a vehicle 200 by a means 45 that may consist of bonding or various mechanical fasteners. Additional fabrication techniques would include fiberglass lay-up or other composite lay-up process, a mold process or a mechanical punch process. FIG. 5g through FIG. 5i show the subject invention 40 as an integral part of a vehicle 200 consisting of a plurality of forward extended adjacent surfaces 41 that are constructed in a manner that produces a continuous surface with the front surface 201 of a vehicle. Typical fabrication techniques would include fiberglass lay-up or other composite lay-up process, a mold process or a mechanical punch process. The material selection will be appropriate for the process selected but may be metal, plastic or a composite or other lightweight and structurally sound material.

Advantages

From the description provided above, a number of advantages of the cross flow vortex strips device become evident:

The invention provides a novel process to reduce the aerodynamic drag of a bluff body.

(a) The invention provides a means to use the forward facing bluff surface of a body or vehicle to reduce aerodynamic drag.

(b) The invention provides a means to reduce the aerodynamic drag and improve the operational efficiency of bluff faced vehicles.

(c) The invention provides a means to reduce the aerodynamic drag and improve the fuel efficiency of bluff faced vehicles.

(d) The invention provides a means to conserve energy and improve the operational efficiency of bluff faced vehicles.

(e) The invention provides a means to reduce the aerodynamic drag without a significant geometric modification to existing bluff faced vehicles.

(f) The invention may be easily applied to any existing bluff face vehicle or designed into any new bluff face vehicle.

(g) The invention allows for the efficient operation of the invention with a limited number of forward extended surfaces.

(h) The invention allows for the matching of complex surface shapes by the shaping and placement of the plurality of forward extended surfaces.

(i) Large reductions in aerodynamic drag force can be achieved by the summation of the plurality of drag reduction forces created by the plurality of vortices generated by the plurality of forward extended surfaces.

(j) The structure of each forward extended surface may be adapted to meet specific performance or vehicle integration requirements.

(k) The shape of each single forward extended surface may be planar, non-planar, or combinations thereof to meet specific performance or vehicle integration requirements.

(l) The ability to optimally position each forward extended surface in the vehicle gap flow field.

(m) The ability to minimize weight and volume requirements within the vehicle.

(n) The ability to minimize maintenance requirements.

(o) The ability to maximize the safety of vehicle operation.

Conclusion, Ramifications, and Scope

Accordingly, the reader will see that the cross flow vortex strips device can be used to easily and conveniently reduce aerodynamic drag on any ground vehicle for the purposes of improving the operational performance of the vehicle. Furthermore, the plurality of forward extended adjacent surfaces comprising the cross flow vortex strips device has the additional advantages in that:

- it provides a distributed aerodynamic drag reduction force over the face of the vehicle;
- it allows the contour of the host surface to be easily matched;
- it allows easy application to any existing vehicle or designed into any existing vehicle;
- it allows the device to be fabricated as an independent unit that may be applied to an existing surface;
- it allows for optimal positioning of each forward extended surface in the vehicle gap flow field;
- it allows the design of a system with minimum weight and to require minimum volume within the vehicle;
- it allows minimum maintenance requirements;
- it allows for the maximum safety of vehicle operation;

Although the description above contains many specificities, these should not be construed as limiting the scope of the invention but as merely providing illustrations of some of the presently preferred embodiments of this invention. For example, the forward extended surfaces can have various non-planar shapes such as circular, oval, ellipsoid, complex, etc.; the thickness and width can vary along the length; the material can be any light-weight and structurally sound material such as wood, plastic, metal, composites, etc.; the substrate can be any metal, wood, plastic, composite, rubber, ceramic, etc.; the application surface can be that of a metal, wood, plastic, composite, rubber, ceramic, etc.

The invention has been described relative to specific embodiments thereof and relative to specific vehicles, it is not so limited. The invention is considered applicable to any road vehicle including automobiles, trucks, buses, trains, recreational vehicles and campers. The invention is also considered applicable to non-road vehicles such as hovercraft, watercraft, aircraft and components of these vehicles. It is to be understood that various modifications and variation of the specific embodiments described herein will be readily apparent to those skilled in the art in light of the above teachings without departing from the spirit and scope.

Thus, the scope of the invention should be determined by the appended claims and their legal equivalents, rather than by the examples given.

I claim:

1. An aerodynamic drag reduction device for use on a trailing vehicle comprising:
    a plurality of surfaces attached to a forward facing exterior surface of the trailing vehicle;
    wherein the surfaces are substantially equally spaced apart from each other and positioned substantially symmetrically with respect to the vertical plane of symmetry of the trailing vehicle;
    wherein the surfaces are aligned so as to be substantially parallel to the longitudinal axis of the trailing vehicle;
    wherein the surfaces have a thickness of less than 1 inch and extend out from the exterior surface of the trailing vehicle a distance of 10 to 50 percent of the longitudinal gap distance between the forward facing exterior surface of the trailing vehicle and the aft facing exterior surface of a leading vehicle;
    whereby the surfaces generate vortices of substantially equivalent strength and rotational velocity to reduce air pressure on the forward facing exterior surface of the vehicle and reduce drag.

2. The drag reduction device of claim 1, wherein the surfaces are rigid.

3. The drag reduction device of claim 1, wherein the surfaces are flexible.

4. The drag reduction device of claim 1, wherein the vehicle is a tractor-trailer truck.

5. The drag reduction device of claim 1, wherein the vehicle is a train or rail vehicle.

6. The drag reduction device of claim 1, wherein the vehicle is an automobile pulling a trailer.

7. The drag reduction device of claim 1, wherein the leading edge of each surface is aerodynamically sharp.

8. The drag reduction device of claim 1, wherein each of the surfaces is constructed as a separate element and attached separately to the vehicle.

9. The drag reduction device of claim 1, wherein two or more of the surfaces are constructed as a single assembly and attached to the vehicle.

10. The drag reduction device of claim 1, further comprising a base plate, wherein two or more of the surfaces are affixed to the base plate and the base plate is attached to the vehicle.

11. The drag reduction device of claim 1, wherein the surfaces are integrally attached to the surface of the vehicle.

12. The drag reduction device of claim 1, wherein the surfaces are of substantially equal length to each other and are aligned with respect to their distance from the edge of the exterior surface of the vehicle.

13. The drag reduction device of claim 1, wherein the vehicle includes a trailing vehicle or multiple component vehicle and the surfaces are attached to a forward facing exterior surface of the trailing vehicle or vehicle component.

14. An aerodynamic drag reduction device for a trailing vehicle having a substantially planar exterior forward face, the device comprising:
    a plurality of adjacent surfaces attached to the forward face of the vehicle,
    wherein the adjacent surfaces are configured so as to be oriented in parallel along a fore and aft direction, distributed at the same height over a majority of the forward face, symmetrically distributed about the vertical axis;
    wherein each of the adjacent surfaces are substantially the same size, with a fore and aft length of about 10 and 50 percent of the longitudinal gap distance between the forward face of the trailing vehicle and the aft face of a leading vehicle, a vertical length substantially equivalent to a majority of the vehicle length of the forward face, and a width of less than about 1 inch;
    wherein the plurality of adjacent surfaces are evenly spaced apart at a separation distance substantially equivalent to the fore and aft length of the adjacent surfaces; and
    wherein the adjacent surfaces are further configured in relation to the vehicle so as to interact with any crosswind air flow across the forward face to create vortices of substantially equivalent strength, pressure, and rotational velocity between the adjacent surfaces thereby reducing the overall air pressure at the forward face.

15. An aerodynamic drag reduction device of claim 14, wherein said adjacent surfaces are flexible.

16. An aerodynamic drag reduction device of claim 14, wherein each of said adjacent surfaces is constructed as a separate element and attached to said vehicle.

17. An aerodynamic drag reduction device of claim 14, wherein two or more of said adjacent surfaces are constructed as a single assembly and attached to said vehicle.

18. An aerodynamic drag reduction device as specified in claim 14, wherein said vehicle is a tractor-trailer truck ground vehicle.

19. An aerodynamic drag reduction device as specified in claim 14, wherein said vehicle is a train or rail vehicle ground vehicle.

20. An aerodynamic drag reduction device as specified in claim 14, wherein said vehicle is an automobile pulling a trailer ground vehicle.

21. The aerodynamic drag reduction device of claim 14, wherein the adjacent surfaces are rigid.

* * * * *